March 20, 1951 H. E. GRIMES 2,546,067
TWO-WAY TELEPHONE TRUNK CIRCUIT
Filed June 7, 1947
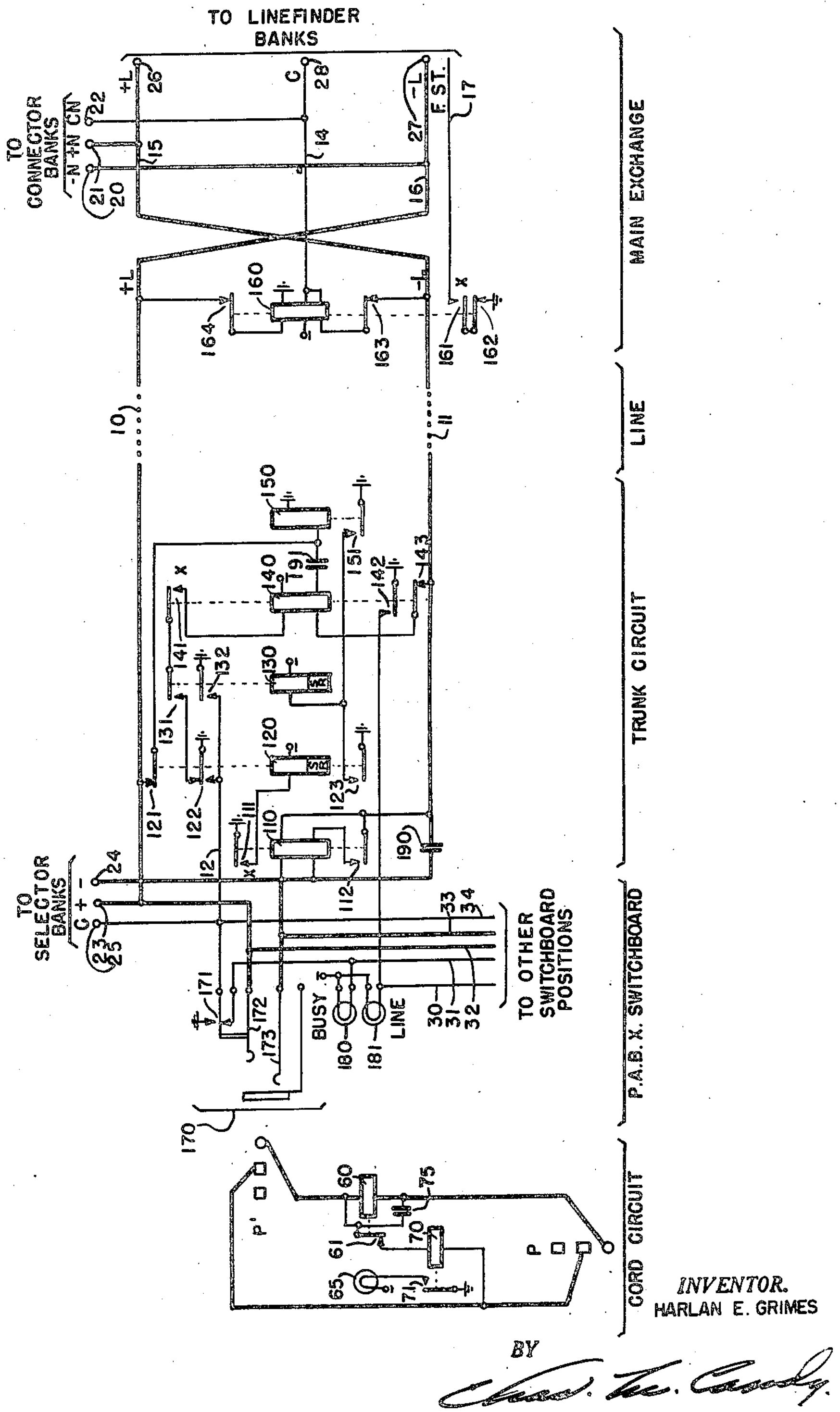
INVENTOR.
HARLAN E. GRIMES
BY
[signature]
ATTORNEY Patented Mar. 20, 1951

2,546,067

UNITED STATES PATENT OFFICE 2,546,067

TWO-WAY TELEPHONE TRUNK CIRCUIT

Harlan E. Grimes, Bromley, Ludlow Station, Ky., assignor to Automatic Electric Laboratories, Inc., Chicago, Ill., a corporation of Delaware Application June 7, 1947, Serial No. 753,210

8 Claims. (Cl. 179—27)

This invention relates to telephone systems in general, but is concerned more particularly with automatic telephone systems in which both main automatic exchange and private automatic branch exchanges are employed; and the broad general object, briefly stated, may be said to consist of the provision of a novel and improved circuit arrangement for a two-way trunk connecting the branch and main exchanges.

Private branch exchanges in systems of the above type may be arranged with the subscribers' lines accessible via automatic switches controlled by an attendant, or the subscribers' lines may be multipled to manual switchboard jacks at the attendant's switchboard, in which case incoming calls from the main exchange are to be completed directly by means of cord circuits. The present invention contemplates either arrangement, but the latter arrangement will be considered herein.

It has been general practice heretofore to use in the trunk circuit between the exchanges a relay in series with one of the line conductors of the trunk loop, thus relay having a very low resistance winding and requiring a close and sensitive adjustment. Considerable difficulty has been encountered in the operating characteristic of the trunk loop, this relay having a very low resistance trunk loops and heretofore a compensating resistance was required at the trunk line circuit equipment at the main exchange to obtain satisfactory operation.

In order to overcome the above objections, one of the features of the invention is to supply the aforementioned series relay with a second winding having a considerably higher resistance in relation to the first winding and therefore more turns, than that of the single winding formerly used. The use of this higher resistance winding allows for a stiffer and more satisfactory adjustment of the series relay, thereby overcoming its tendency to remain operated after its operating circuit has been opened. This higher resistance winding with its larger number of turns, affords a higher ampere-turn value for the restricted amount of current in the trunk loop and the circuit is so arranged that this winding is required only to operate one set of preliminary make contact springs, which in turn conditions the trunk circuit for seizure by the selector without the need of a compensating resistance at the trunk line equipment. After seizure of the trunk by the selector, sufficient current flows through the loop to allow the higher resistance winding of the trunk circuit series relay to operate completely and thereby closing another circuit placing its second or low resistance winding in parallel with its first winding. Therefore these two windings in multiple reduce the series trunk loop resistance to a minimum value satisfactory for dialing impulses to be sent over the loop and for voice transmission, but developes sufficient ampere-turns to maintain the relay completely operated. The effect of the high resistance winding shunted across the low resistance winding acts as a holding shunt for the relay and during the open period of a series of dialed impulses, produces a counter-electromotive-force sufficient to keep the relay operated, thereby maintaining the trunk loop resistance at the minimum value so as not to distort the dialed impulses.

Other objects and features of this invention are concerned mainly with circuit details which will be explained fully hereinafter with reference to the accompanying drawing, which shows by means of the usual circuit diagrams the essential features of the invention.

The drawing illustrates a private automatic branch exchange connected to a main automatic exchange by a trunk line consisting of conductors 10 and 11. To the right of the trunk line are illustrated certain portions of the main automatic exchange considered necessary in describing this invention with the trunk conductors 10 and 11 terminating on standard line equipment, in this case a combined line and cut-off relay 160, operation of which is well known in the art. Further the trunk extends to the right on the drawing where it reverses its polarity in respect to the line relay 160 and extends into two branches. Directly to the right hand side of the drawing one branch of the trunk terminates on a set of bank contacts 26 and 27 of a non-numerical switch and in other multiply-connected sets which are accessible to other non-numerical switches in the main exchange. The non-numerical switch, in this instance, is a line-finder, the exact type being considered unessential to this invention, as its operation is well known in the art. This branch is for use in extending outgoing calls from the private automatic branch exchange to the main exchange. The other branch, which is used for extending calls from the main exchange to the branch exchange, terminates on a set of bank contacts 20, 21 and 22 of a connector switch and in other multiply-connected sets which are accessible to other connectors of the main exchange.

To the left on the drawing the trunk line conductors 10 and 11 terminate on a switchboard jack 170, which is used mostly for answering main to branch exchange calls, although under certain circumstances it may be used by the attendant operator at whose switchboard position it appears, for the purpose of extending special calls from the branch exchange to the main exchange. The switchboard jack 170 is multipled in the well known manner to other switchboard positions by conductors 30, 31, 32, 33, and 34. The trunk line also terminates, at the branch exchange, in a set of bank contacts 23, 24, and 25, which with other multiply-connected sets of contacts, are accessible to well known selector switches in the branch exchange. Associated with the trunk line at the branch exchange there is also provided a trunk circuit, which consists of five relays and proper connecting circuits, which will be fully described hereinafter.

As previously indicated, the exact type of switches employed is immaterial to the invention, but it may be assumed that the selectors and connectors involved are two-motion switches of the well known Strowger type, generally similar, for example, to those shown in U. S. Patent 1,667,915, issued to J. Wicks on May 1, 1928, and that the linefinders are also Strowger switches, generally similar, for example, to those shown in re-issued Patent Re. 16,975, issued to T. G. Martin on May 22, 1928.

To the left of the drawing there is illustrated, for purposes of simplifying this specification, a portion of a cord circuit which is described in Karl L. Burgner's co-pending application Serial No. 646,463, filed February 8, 1946, now Patent No. 2,532,889, issued December 5, 1950. This cord circuit is one of a number of similar cord circuits which are located at the attendant operator's position at the branch exchange, and is used for the purpose of connecting the branch exchange lines with the trunk circuit illustrated, as will be pointed out in detail hereinafter.

The drawing having been described, it will now be assumed that a subscriber in the private automatic branch exchange desires to converse with a subscriber in the main automatic exchange. It will further be assumed that when a calling subscriber at the private automatic branch exchange removes his receiver and dials in the well known manner the main exchange digit in the number of the desired subscriber, a well known Strowger vertical and rotary selector switch seizes the first idle trunk extending to the main exchange.

Assuming that the trunk line shown on the drawing is the first idle trunk line accessible to the selector switch, the wipers of the selector will then stop on the selector bank contacts 23, 24, and 25. The switching relay of the selector will then energize and connect the line and control wipers of the selector to the bank contacts 23, 24, and 25 in the well known manner. A circuit is now closed for energizing the series relay 110 as follows: ground through the upper winding of the combined line and cutoff relay 160, break contacts 164, "+L" conductor 10, selector bank contact 23, wiper of selector switch, the calling subscriber's loop, wiper of the selector switch, selector bank contact 24, high resistance or upper winding of series relay 110, "−L" conductor 11, back contact 163, lower and middle windings in series of relay 160, to negative battery. Relay 110 energizes sufficiently over the above traced circuit to close its "x" or preliminary contacts 111, but does not have sufficient power, due to the restriction of the three windings of relay 160 in series, to operate its other contacts and thereby merely closes the operating circuit to slow-to-release relay 120. Relay 120, upon operating, at make contacts 122 places ground on the trunk control conductor 12 and bank contact 25, thus furnishing a holding circuit to the selector and other switches operated by the calling subscriber in extending the call to the trunk circuit and making this seized trunk busy to all other calls. Relay 120 also by way of back contact 171 lights a busy lamp 180, one of which is associated with each switchboard jack, like 170, in each appearance of the trunk on the various switchboard positions and the other busy lamps are also energized over conductor 31. Relay 120 further, at back contacts 121 removes relay 150 from the "+L" conductor 10, and at contacts 123 closes the operating circuit to slow-to-release relay 130. Relay 130, upon operating, at make contacts 132 places another holding ground on control conductor 12 and at make contacts 131 prepares a holding circuit for relay 140.

Upon the seizure of the trunk by the selector controlled by the calling subscriber and at the same time as the partial energization of the series relay 110, the combined line and cutoff relay 160 partially energizes over the previously traced circuit and closes its "x" or preliminary make contacts 161, but is not energized sufficiently, due to the high resistance winding of relay 110 being in the trunk loop, to operate its other contacts. Upon the closure of "x" contacts 161, ground at back contacts 162 is extended over the finder start lead 17 to the linefinder control relays, which in the well known manner causes the linefinder to extend the calling trunk to a free selector in the main exchange.

The selector in the main exchange, assumed to be of the Strowger type, upon seizure now extends ground back over its control wiper, bank contact 28, to the control conductor 14 which completely operates relay 160 by way of its middle winding. Relay 160, upon completely operating, at back contacts 162 removes the starting ground from conductor 17 and at back contacts 163 and 164 removes its lower and upper windings from the trunk conductors 11 and 10, respectively, thereby clearing the trunk of appendages. The line relay of the seized selector of the main exchange is connected across the trunk loop by way of the linefinder, conductor 15 and 16 and bank contacts 26 and 27, and extends ground and negative battery back through the linefinder over conductors 15 and 16 respectively to the trunk and calling subscriber's loop in the well known manner. With the removal of the combined line and cutoff relay 160 from the trunk and the line relay of the main exchange selector now supplying ground and battery to the trunk, the current in the trunk is increased to a value sufficient to effect complete operation of the series relay 110. Relay 110, upon complete operation, at make contacts 112 connects its low resistance or lower winding in multiple with its upper winding, thereby reducing the trunk loop resistance and conversely increasing the current to a value considered practical for dialing and voice transmission.

The trunk circuit, the linefinder and the seized selector are now in condition to extend the connection, dial tone being returned by the seized selector back to the calling subscriber. The calling subscriber now manipulates his calling device in accordance with the remainder of the directory telephone number of the desired subscriber in the main exchange, with the result that the desired connection is completed and the desired subscriber's bell is rung by the connector switch in the usual manner. Relay 110 will not respond to dialing impulses due to the shunting effect of its high resistance winding on its low resistance winding, thus maintaining a low resistance trunk loop and preventing distortion of the dialed impulses. When the called subscriber answers, the ringing current is cut off by the connector in the usual manner and the talking circuit is completed through the by-pass condenser 190 connected across the windings of relay 110, whereupon the two subscribers converse in the usual manner.

When the conversation is completed, the two subscribers replace their receivers. When the receiver of the calling subscriber at the branch exchange is replaced, the circuit of relay 110 of the trunk circuit and the line relay of the connector in the main exchange is opened. Relay 110, upon restoring, at contacts 111 opens the circuit to slow-to-release relay 120, which thereupon shortly restores and at contacts 122 removes its ground from the control conductor 12, at contacts 123 opens the operating circuit to relay 130 and at contacts 121 re-connects relay 150 to the trunk conductor 10. Relay 130, after a slight delay, restores and at contacts 132 further removes ground from control conductor 12. Ground now removed from control conductor 12 allows the release of the switches which were operated by the calling subscriber and also extinguishes the busy lamp 180.

Shortly after the restoring of the line relay of the connector switch in the main exchange caused by the calling subscriber hanging up his receiver, ground is removed from the control conductor 14 thereby restoring the combined line and cutoff relay 160 to normal. The line relay of the connector will not be held energized by the reconnection of relay 150 to the trunk conductor 10 due to the high resistance of relay 150. The trunk is now free and ready to receive another call.

Having described the operation of the trunk circuit in connection with a call from the private branch exchange to the main exchange, an explanation will now be given of a call from the main exchange to a subscriber in the private automatic branch exchange. It will now be assumed that the subscriber at the main automatic exchange desires to converse with a subscriber in the private automatic branch exchange and that he accordingly removes his receiver and dials the number of the branch exchange as listed in the telephone directory.

It will further be assumed that a connector switch in the main exchange seizes the trunk terminals 20, 21, and 22, responsive to the dialing of the digits of the telephone number of the private branch exchange. The connector switch, upon seizing the bank contacts 20, 21 and 22 of the trunk line, places ground on control terminal 22, whereupon a circuit is closed for operating completely the combined line and cutoff relay 160 by way of its middle winding. Relay 160, upon operating completely, removes itself from the trunk conductors 10 and 11 at contacts 164 and 163 and prevents any operation of a linefinder by removing ground at contacts 162. A further result of the connector switch seizing the trunk bank contacts 20, 21, and 22 results in the energization of high resistance relay 150 of the trunk circuit. The circuit for energizing relay 150 may be traced as follows; from battery superimposed on the ringing circuit, through the winding of the connector ring cutoff relay, over the connector switch wipers to bank terminal 20, "—L" conductor 16, "+L" trunk conductor 10, back contacts 121, winding high resistance relay 150 to ground. Relay 150 is energized either during the ringing period of the connector switch, or during the silent period. Relay 150, upon operating, at contacts 151 closes an operating circuit to slow-to-release relay 130. Relay 130, upon operating, at contacts 132 connects ground to control conductor 12, thereby making the trunk busy to the selector switches of the private branch exchange which have access thereto and lighting the busy lamp 180, and at contacts 131 prepares a locking circuit to relay 140. Relay 150 is of such high resistance that the ring cutoff relay of the connector will not operate. When ringing current is applied to the trunk circuit at the connector switch, relay 140 operates over the previously traced circuit for relay 150, through ringing condenser 191, lower winding relay 140, back contacts 143, trunk conductor 11, trunk bank terminal 21 to ground in the connector.

Relay 140, upon operating, "$x$" or preliminary make contacts 141 locks through its upper winding to ground at back contacts 122, at back contacts 143 opens its operating circuit and at make contacts 142 closes a circuit for lighting the line lamp 181 which indicates to the operator at the private branch exchange that a subscriber at the main exchange desires connection with a subscriber in the private branch exchange.

When the operator perceives the lighted condition of line lamp 181, she inserts the answering plug of an idle cord circuit, for example the plug P' of the cord circuit, into the jack 170. Responsive to the plugging in of the plug P' into the jack 170, a circuit is closed for energizing relay 110 in series with the relay 70 of the cord circuit. The closing of the trunk loop by the connection of relay 70 across it operates the ring cutoff relay in the connector which in turn switches the trunk through to the connector back-bridge relay. Relays 70 and 110 operate over the following circuit; ground through one winding of the connector back-bridge relay, connector wiper, bank terminal 21, "—L" conductor 15, "—L" trunk conductor 11, upper winding relay 110, ring terminal 173 of the jack 170, ring terminal of the plug P', winding relay 70, back contacts 61, tip terminal of the plug P', tip terminal 172 of the jack 170, "—L" trunk conductor 10, "—L" conductor 16, bank terminal 20, connector wiper, to negative battery through the other winding of the connector back-bridge relay. Relay 110, upon operating completely due to the large value of current in the loop being fed from the connector back-bridge relay, at make contacts 111 closes the circuit to relay 120, and at make contacts 112 places its low resistance winding in parallel with its high resistance winding. Relay 120, upon operating, at back contacts 122 opens the holding circuit to relay 140, at make contacts 122 places a further holding ground on control conductor 12, at back contacts 121 opens the circuit to relay 150 and at make contacts 123 closes a holding circuit for relay 130. Relays 140 and 150 restore to normal. The trunk circuit is now in condition for conversation.

Relay 70 of the cord circuit, upon operating, closes a circuit for lighting a supervisory lamp 65 at contacts 71.

The operator now throws a key, not shown, thereby connecting her headset to the conductors of the cord circuit. The operator now converses with the calling subscriber and ascertains from him the number of the desired substation. Upon learning that the calling subscriber desires to converse with one of the subscribers at the private branch exchange, the operator checks to determine if the busy lamp 180 associated with the called subscriber's jack is lighted. If the busy lamp is not lighted, indicating the line is idle, the operator inserts the plug P into the jack of the called line and rings the called party in a well known manner. When the called subscriber at the branch exchange removes his receiver, a bridge is placed across the conductors of the line. The supervisory relay 60 which is connected in series in the right hand conductor of the cord circuit is consequently connected in multiple with the bridge across the trunk circuit which includes relay 70. As a result of the direct current bridge placed across the line by the answering party, the supervisory relay 60 operates in series with the back-bridge relay of the connector switch in the main exchange. Relay 60, upon operating, at contacts 61 removes relay 70 from the cord circuit, which in turn extinguishes the supervisory lamp 65 indicating to the operator that the call has been answered. The calling and called subscribers may now converse with each other as desired.

When the conversation is completed, the two subscribers replace their receivers.

It will be assumed that the calling subscriber in the main exchange is the first to replace his receiver. The line relay of the connector switch in the main exchange de-energizes and prepares the circuit for releasing the connector. The connector, however, does not release because the back-bridge relay is maintained energized by the called subscriber. The switches used by the calling subscriber in the main exchange with the exception of the connector switch, release in the well known manner. The connector switch, however, maintains ground on the control trunk terminal 22, to maintain the combined line and cutoff relay 160 operated until the called subscriber hangs up.

When the called subscriber at the branch exchange replaces his receiver relay 60 in the cord circuit restores and at contacts 61 replaces relay 70 across the trunk loop. Relay 70, upon operating, at contacts 71 re-lights the supervisory lamp 65 indicating to the operator that the called subscriber has hung up and that plugs P′ and P may be removed from their respective jacks.

Upon the removal of the plug P′ from the jack 170 the trunk loop is opened and the back-bridge relay of the connector switch in the main exchange and the series relay 110 restore to normal. The restoring of relay 110 opens the operating circuit to slow-to-release relay 120, which in turn opens the operating circuit to slow-to-release relay 130. Shortly after the restoring of relay 110, relay 120 restores and then relay 130 restores, thereby removing ground from control conductor 12 extinguishing the busy lamp 180 and removing ground from the selector bank terminal 25. Shortly after the restoring of the back-bridge relay in the connector, ground is removed from the control terminal 22 and the combined line and cutoff relay restores. The trunk is now free and ready for other calls.

The operator at the branch exchange with the aid of the cord circuit and a calling device such as a dial, not shown, is able to set up a call to the main automatic exchange by inserting the plug P′ into the jack 170 after which she dials the number of the desired subscriber in the main exchange. The operation of the trunk circuit is the same as previously described for completing a connection from a private branch exchange subscriber to a called main exchange subscriber.

On a call from a subscriber at the private branch exchange to a toll operator or the like in the main automatic exchange means is required so that the toll operator may at will hold the trunk even though the calling subscriber has hung up his receiver. Assuming that a subscriber at the branch exchange has dialed a toll operator at the main exchange, the seizure of the trunk and extension of the trunk loop to the toll operator's position is the same as previously described for a call from a subscriber in the branch exchange to a subscriber in the main exchange. It is assumed that the toll operator has answered the calling party and has ascertained the information required for placing, say a call to a distant exchange. If for some reason the call cannot be completed immediately the toll operator can tell the calling subscriber to hang up his receiver and that she will ring him when the call is ready. The hanging up of the receiver by the calling subscriber in this case will not release the trunk as long as the toll operator keeps her answering plug in the answering jack. Upon the opening of the loop by the hanging up of the receiver relay 110 in the trunk circuit restores and at contacts 111 opens the circuit to slow-to-release relay 120.

After a short delay, relay 120 restores and at contacts 121 connects relay 150 to the trunk conductor 10, at make contacts 122 removes one of the holding grounds from the control conductor 12, at back contacts 122 prepares the holding circuit for relay 140 and at contacts 123 opens the operating circuit to slow-to-release relay 130. Relay 150 now operates from negative battery through the line relay of the selector in the main exchange on which the toll operator's position terminates, wiper of the selector switch, bank contact 27, "—L" conductor 16, "+L" conductor 10, contacts 121, winding relay 150, to ground. Relay 150, upon operating, at contacts 151 closes another operating circuit to relay 130, which being slow-to-release has remained operated after the release of relay 120. The trunk circuit is now held and the ground on control conductor 12 maintains the selector and other switches operated in the branch exchange.

When the toll operator is ready to complete the wanted connection she operates her ring key which places ringing current on the trunk and relay 140 operates, as previously described, at contacts 141 locks to ground at contacts 122, and at back contacts 143 removes itself from the trunk loop. The ringing current also rings the calling subscriber's bell and when he answers by removing his receiver the loop is again closed and relays 110 and 120 operate and relays 140 and 150 restore as previously described.

The release of the trunk circuit and the associated operated switches is dependent upon the toll operator. This release is effected by the toll operator removing the answering plug from the jack associated with the calling trunk which in turn allows the release of the selector associated with the toll operator.

Having fully described and ascertained the features and aspects of the invention, what is considered to be new and desired to have protected by Letters Patent will be pointed out in the appended claims.

What is claimed is:

1. In a telephone system, a main exchange and a branch exchange, a two conductor trunk connecting said exchanges, means for seizing said trunk at said branch exchange, a series relay having a high resistance winding connected in series with one conductor of said trunk, a busying relay, a first set of contacts on said series relay operated in response to said seizure for operating said busying relay to busy said trunk at said branch exchange, finder switches in said main exchange having access to said trunk, means in said trunk responsive to said seizure for operating an idle one of said finders to connect with said trunk and to extend the same, a low resistance winding on said series relay, and a second set of contacts on said series relay operated in response to said connection of said one finder to said trunk for connecting said low resistance winding in multiple with said high resistance winding to reduce the resistance included in series with said one conductor of said trunk.

2. In a telephone system, a main exchange and a branch exchange, a two conductor trunk connecting said exchanges, means for seizing said trunk at said branch exchange, a series relay having a high resistance winding connected in series with one conductor of said trunk, finder switches in said main exchange having access to said trunk, means in said trunk responsive to said seizure for operating an idle one of said finders to connect with said trunk and to extend the same, a low resistance winding on said series relay, and a set of contacts on said series relay operated in response to said connection of said one finder to said trunk for connecting said low resistance winding in multiple with said high resistance winding to reduce the resistance included in series with said one conductor of said trunk.

3. In a telephone system, a main automatic exchange and a private automatic branch exchange, a two conductor trunk connecting the main exchange and the branch exchange, said trunk terminating in multiple switch banks at the branch exchange and in an automatic switch at the main exchange, a relay having a high resistance winding and a low resistance winding, said high resistance winding connected in series with one conductor of said trunk, said trunk seizable through said switch banks, means in said trunk operative responsive to said seizure for busying said trunk, other means in said trunk also responsive to said seizure for causing said automatic switch to hunt and seize an idle path in the main exchange, and means responsive to connection of said trunk to said idle path to connect said low resistance winding in multiple with said high resistance winding.

4. In a telephone system, a main automatic exchange and a private automatic branch exchange, a two conductor trunk connecting the main exchange and the branch exchange, said trunk terminating in multiple switchboard jacks at the branch exchange and in an automatic switch at the main exchange, a relay having a high resistance winding and a low resistance winding, said high resistance winding connected in series with one of the two conductors of said trunk, means for seizing said trunk at said switchboard jacks, means in said trunk operative responsive to said seizure for busying said trunk, other means in said trunk also operative responsive to said seizure for causing said switch to hunt and seize an idle path in the main exchange, and means responsive to connection of said trunk to said idle path to connect said low resistance winding in multiple with said high resistance winding.

5. In a telephone system, a main automatic exchange and a private automatic branch exchange, a two conductor trunk connecting the main exchange and the branch exchange, said trunk terminating in multiple switchboard jacks at the branch exchange and in multiple switch banks at the main exchange, a relay having a high resistance winding and a low resistance winding, said high resistance winding connected in series with one conductor of said trunk, said trunk seizable through any one of said switch banks in response to an incoming call, plug and cord means for answering said incoming call at said switchboard jacks, and a circuit completed through said plug and cord means responsive to such answering of said call for causing said relay to operate and connect said low resistance winding in multiple with said high resistance winding, thereupon reducing the loop resistance of said trunk.

6. In a telephone system, a main automatic exchange and a private automatic branch exchange, a two conductor trunk connecting the main exchange with the branch exchange, said trunk terminating in multiple switch banks at the branch exchange and in non-numerical hunting switches at the main exchange, a relay having a plurality of sets of contacts, a high resistance winding of said relay in series with one conductor of said trunk, said winding operative upon seizure of said trunk for operating only one set of said contacts, means responsive to the seizure of said trunk at said banks for operating an idle one of said non-numerical switches to extend the connection, said winding operative in response to said extension for operating said relay completely to operate its remaining contacts, and a low resistance winding of said relay connected in multiple with said high resistance winding in response to the operation of said last mentioned contacts.

7. In a telephone system, a main automatic exchange and a private automatic branch exchange and a private automatic branch exchange, a two conductor trunk connecting the main exchange with the branch exchange, said trunk terminating in multiple switchboard jacks at the branch exchange and in non-numerical hunting switches at the main exchange, a relay having a plurality of sets of contacts, a high resistance winding on said relay connected in series with one conductor of said trunk, said winding operative upon seizure of said trunk for operating only one set of said contacts, means responsive to seizure of said trunk at said jacks for operating one of said non-numerical switches to extend the connection, said winding responsive to said extension for operating said relay completely to operate its remaining contacts, and a low resistance winding on said relay connected in multiple with said high resistance winding in response to the operation of last mentioned contacts.

8. In a telephone system, a main automatic exchange and a private automatic branch exchange, a two conductor trunk connecting the main exchange and the branch exchange, a high resistance relay normally connected between one of said trunk conductors and to ground, said trunk seizable from said main exchange, means in said trunk responsive to such seizure for making said trunk busy at the main exchange end, said relay also energized responsive to said seizure, means responsive to operation of said relay to make said trunk test busy at the branch exchange end, an operator's position including a cord circuit, a second relay having a high resistance winding and a low resistance winding, said high resistance winding connected in series with one conductor of said trunk, circuit means responsive to connection of said cord circuit with said trunk for operating said second relay, means responsive to operation of said second relay for connecting said low resistance winding in multiple with said high resistance winding, and other means also responsive to the operation of said second relay for de-energizing said first relay and for maintaining said trunk busy at the branch exchange terminals.

HARLAN E. GRIMES.

REFERENCES CITED

The following references are of record in the file of this patent:

UNITED STATES PATENTS

| Number | Name | Date |
|---|---|---|
| 2,186,219 | Toomey | Jan. 9, 1940 |